US012718635B2

(12) United States Patent
Veshchikov et al.

(10) Patent No.: US 12,718,635 B2
(45) Date of Patent: Aug. 25, 2026

(54) DATA PROCESSING SYSTEM AND METHOD FOR COOPERATIVE VEHICLE MALFUNCTION DETECTION IN A FLEET OF VEHICLES

(71) Applicant: NXP B.V., Eindhoven (NL)

(72) Inventors: Nikita Veshchikov, Brussels (BE); Wim Nuyts, Leuven (BE)

(73) Assignee: NXP B.V., Eindhoven (NL)

( * ) Notice: Subject to any disclaimer, the term of this patent is extended or adjusted under 35 U.S.C. 154(b) by 225 days.

(21) Appl. No.: 18/323,556

(22) Filed: May 25, 2023

(65) Prior Publication Data

US 2024/0395083 A1 Nov. 28, 2024

(51) Int. Cl.

| | |
|---|---|
| ***G07C 5/08*** | (2006.01) |
| ***B60W 50/14*** | (2020.01) |
| ***G07C 5/00*** | (2006.01) |
| ***H04W 4/46*** | (2018.01) |

(52) U.S. Cl.

CPC .......... *G07C 5/0808* (2013.01); *B60W 50/14* (2013.01); *G07C 5/008* (2013.01); *H04W 4/46* (2018.02)

(58) Field of Classification Search

None

See application file for complete search history.

(56) References Cited

U.S. PATENT DOCUMENTS 6,766,232 B1 * 7/2004 Klausner ................ G07C 5/085 701/32.9
8,170,747 B2 5/2012 Chen et al.
9,499,139 B2 11/2016 Koravadi
10,013,883 B2 7/2018 Farnham et al.
10,046,701 B2 8/2018 Hikita
10,137,892 B2 11/2018 Koravadi
10,339,726 B2 7/2019 Thorley et al.
2004/0145496 A1 7/2004 Ellis
2017/0365105 A1 * 12/2017 Rao ...................... G08G 1/0112
2018/0005460 A1 * 1/2018 Alieiev .................. H04W 4/46

(Continued)

FOREIGN PATENT DOCUMENTS

CN 105702018 A 6/2016
CN 108429796 A 8/2018

(Continued)

*Primary Examiner* — James J Lee

*Assistant Examiner* — Melanie G Huber

(57) ABSTRACT

A method is provided for cooperative malfunction detection between an observer vehicle and an observed vehicle. The method includes requesting, by the observed vehicle, a report of observed malfunctions of the observed vehicle from the observer vehicle via a vehicle-to-vehicle (V2V) communication system. The observer vehicle detects and captures sensor data of the observed vehicle by the observer vehicle. Then, in one embodiment, the observer vehicle transmits the captured sensor data to the observed vehicle using the V2V communication system. The observed vehicle runs a malfunction detection function on the captured sensor data and generates a report summarizing the malfunction. Alternatively, the observer vehicle generates the report and transmits it to the observed vehicle. The driver of the observed vehicle is notified of the report. In another embodiment, a data processing system is provided for performing the method in the observer vehicle or the observed vehicle.

23 Claims, 4 Drawing Sheets

(56) References Cited

U.S. PATENT DOCUMENTS

| | | | | |
|---|---|---|---|---|
| 2019/0039545 | A1* | 2/2019 | Kumar | G07C 5/008 |
| 2019/0189007 | A1* | 6/2019 | Herman | G08G 1/0133 |
| 2019/0197497 | A1* | 6/2019 | Abari | G05D 1/0088 |
| 2019/0371093 | A1 | 12/2019 | Edren et al. | |
| 2020/0057453 | A1* | 2/2020 | Laws | G08G 1/22 |
| 2020/0137580 | A1* | 4/2020 | Yang | H04W 12/122 |
| 2020/0180649 | A1 | 6/2020 | Baron et al. | |
| 2020/0211303 | A1* | 7/2020 | Walsh | G06N 7/01 |
| 2021/0191424 | A1 | 6/2021 | Drayna et al. | |
| 2021/0192861 | A1 | 6/2021 | Rao et al. | |
| 2021/0256846 | A1* | 8/2021 | McErlean | G08G 1/091 |
| 2022/0068051 | A1* | 3/2022 | Krishnamurthy | G05B 23/0283 |
| 2023/0045241 | A1* | 2/2023 | Naserian | H04W 4/46 |
| 2023/0107920 | A1* | 4/2023 | Lu | H04W 68/005 455/456.1 |

FOREIGN PATENT DOCUMENTS

| | | | |
|---|---|---|---|
| CN | 111724602 | A | 9/2020 |
| DE | 102020117705 | A1 | 3/2021 |
| JP | 6373643 | B2 | 8/2018 |
| TW | I753480 | B | 1/2022 |

* cited by examiner

DATA PROCESSING SYSTEM AND METHOD FOR COOPERATIVE VEHICLE MALFUNCTION DETECTION IN A FLEET OF VEHICLES

FIELD

This disclosure generally relates to data processing, and more particularly, to a data processing system and method for cooperative vehicle malfunction detection in a fleet of vehicles.

RELATED ART

Automobiles sometimes have maintenance issues that require immediate attention. Some cars have sensors that can notify the driver in case of an issue, such as for example, low engine oil level or low tire pressure. However, some of the common issues may not be reported to the driver immediately by the car itself. For example, a malfunctioning headlight or tail light or turn signal may not be noticed or reported by the car. These issues are often overlooked by drivers since a driver typically only sees the car from the inside. For example, regarding brake lights, in addition to being outside of the car, someone has to press the brake pedal from the inside of the car for the brakes to illuminate. Thus, a driver might not notice that his brake lights do not function properly.

Moreover, some of the issues might only be noticeable from outside the car and only while the car is running. For example, smoke from the exhaust pipe may not be noticed, which can cause the car to stop running and strand the occupants of the car. Furthermore, some issues may only be visible by looking underneath the car, for example, fluid leaking from the car's engine, transmission, or radiator. In addition, some issues may only be apparent by measuring temperate, e.g., with an infrared (IR) camera.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
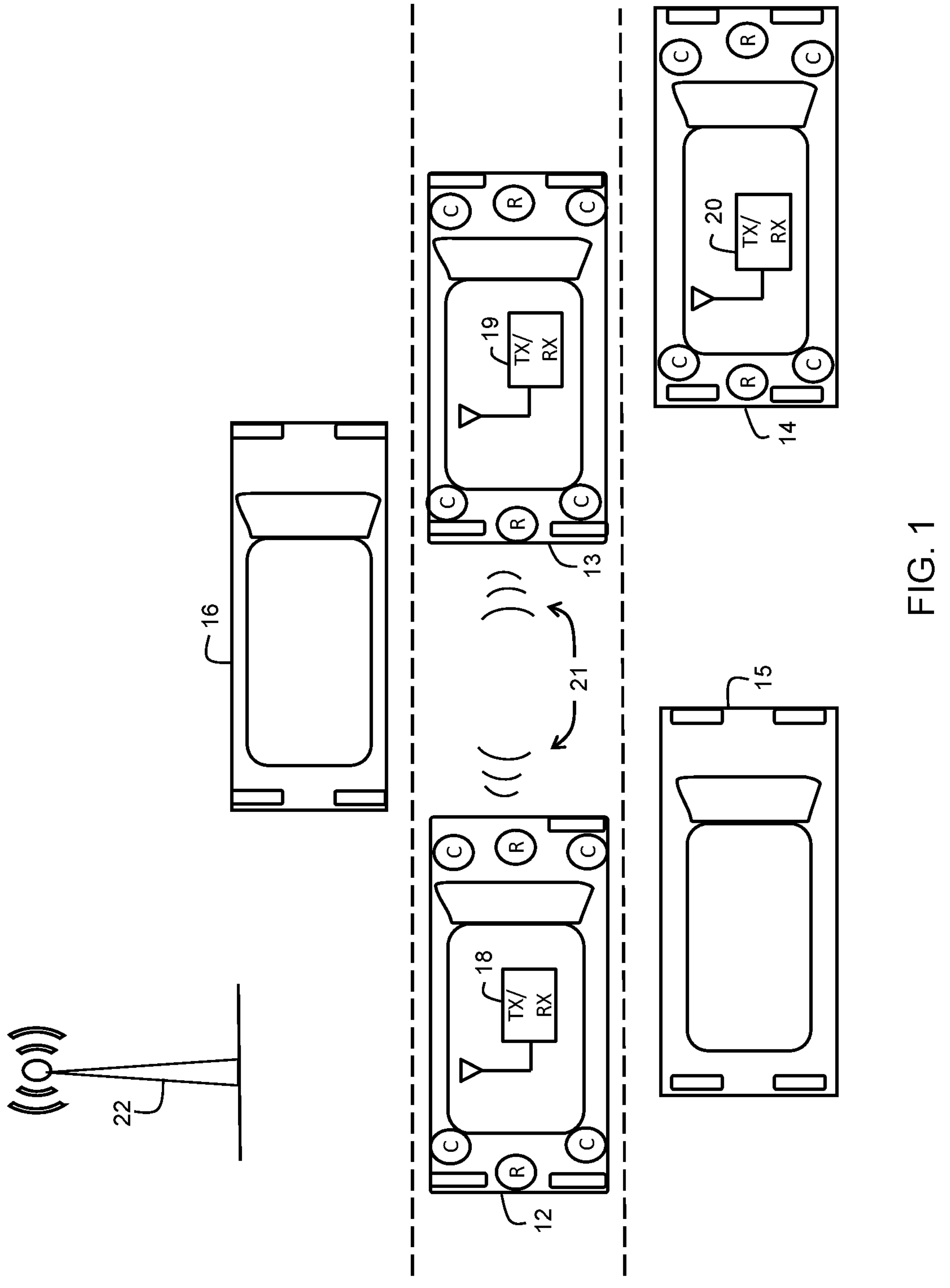
FIG. 1 illustrates a top-down view of a car requesting monitoring and a car responding to the request in moving traffic according to an embodiment.

Generally, there is provided, a method and data processing system for cooperative vehicle malfunction detection. In one embodiment, the method for cooperative vehicle malfunction detection may be performed between one or more observer vehicles and an observed vehicle. In another embodiment, the cooperative vehicle malfunction detection may also involve communication with an infrastructure such as a service provider or car dealership. In one embodiment of the method, an observed vehicle transmits a request for malfunction detection to an observer vehicle. The observer vehicle uses a plurality of onboard sensors to detect and capture sensor data of observed malfunctions and generate a report of the observed malfunctions of the observed vehicle using a cooperative malfunction detection circuit. The observer vehicle transmits the report of the captured sensor data to the observed vehicle using a conventional vehicle-to-vehicle (V2V) communication system. Also, the communication between vehicles may use one or more of WiFi, Bluetooth, or ultra-wideband (UWB) or other communication standard. In another embodiment, the observer vehicle transmits raw sensor data to the observed vehicle and the observed vehicle provides the processing resources to generate a report of the observed malfunction. Also, multiple vehicles may be requested to observe the observed vehicle and provide sensor data or report summaries. Using multiple vehicles is this manner can reduce the number of false malfunction detections. After the observed vehicle receives the report of captured sensor data, an onboard diagnostics circuit on the observed vehicle may perform vehicle diagnostics using the report and/or the captured sensor data. A driver of the observed vehicle may receive notification of results of the report and corresponding onboard vehicle diagnostics. In this manner, maintenance and safety issues of the observed vehicle may be discovered that may have otherwise gone unnoticed.

In accordance with an embodiment, there is provided, a method for cooperative malfunction detection between an observer vehicle and an observed vehicle, the method including: requesting, by an observed vehicle, a report of observed malfunctions of the observed vehicle from the observer vehicle via a vehicle-to-vehicle communication system; detecting and capturing sensor data of the observed vehicle by the observer vehicle; transmitting the captured sensor data to the observed vehicle using the vehicle-to-vehicle communication system; running, by the observed vehicle, a malfunction detection function on the captured sensor data and generating a report; and notifying a driver of the observed vehicle of the report. The method may further include: synchronizing clocks of the observer vehicle and the observed vehicle; creating, by the observed vehicle, a timestamped log of events in the observed vehicle while the observer vehicle is detecting and capturing the sensor data; and using the timestamped log of events with the captured sensor data to generate the report. The method may further include the observed vehicle transmitting an identity of the observed vehicle to the observer vehicle. The sensor data may be captured using one or more of an image sensor, radar sensor, lidar (light detection and ranging) sensor, and infrared sensor. The method may further include identifying the observed vehicle by the observer vehicle reading a visually readable code on the observed vehicle using an optical sensor attached to the observed vehicle. Requesting a report of observed malfunctions of the observed vehicle may further include continuously transmitting a request for, by the observed vehicle, a report of observed malfunctions from any vehicle within range. Continuously transmitting the request may further include selecting, by the observed vehicle a specific frequency for the continuously transmitted requests. The method may further include receiving multiple reports of observed malfunctions from multiple vehicles by the observed vehicle. The multiple reports may be requested by the observed vehicle for a particular malfunction and the multiple reports are aggregated to generate one final report. The method may further include the observed vehicle communicating the report of observed malfunctions to an onboard vehicle diagnostics circuit for further analysis.

In another embodiment, there is provided, a data processing system implemented in a first vehicle, the data processing system including: a transceiver coupled to an antenna for communicating with a second vehicle or an infrastructure, the transceiver coupled to an antenna to receive a request for cooperative vehicle malfunction detection from the second vehicle; a networking interface coupled to communicate with a plurality of sensors mounted on the first vehicle; a cooperative malfunction detection circuit coupled to receive sensor data from the plurality of sensors or from the second vehicle via the transceiver, the cooperative malfunction detection circuit configured to analyze the sensor data and generate a report of observed vehicle malfunctions; and a vehicle diagnostics circuit configured to perform vehicle diagnostics using the report of observed vehicle malfunctions to determine a cause for an observed vehicle malfunction. The cooperative malfunction detection circuit may be further configured to create a timestamped log of events that occur while the sensor data is being received, and wherein the cooperative malfunction detection circuit may be configured to use the timestamped log of events with the received sensor data to generate the report. The first vehicle determines a vehicle identity of the second vehicle. The sensor data may be captured using one or more of an image sensor, radar sensor, lidar (light detection and ranging) sensor, microphone, and infra-red sensor. The data processing system may further include using a sensor of the plurality of sensors to read a visually readable code on the second vehicle for providing an identify of the second vehicle. The transceiver may be configured to continuously transmit a request for observed malfunctions to other vehicles within range of the first vehicle. The cooperative malfunction detection circuit may be configured to receive multiple reports of observed malfunctions from multiple vehicles regarding a specific observed vehicle malfunction. The cooperative malfunction detection circuit may be further configured to aggregate the multiple reports of observed malfunctions from multiple vehicles to provide one final report. The transceiver may communicate to other vehicles using one of an ultra-wideband (UWB), Wi-Fi, or Bluetooth communications protocol. The data processing system may be implemented on one or more integrated circuits.

FIG. 1 illustrates a top-down view of a car requesting monitoring and a car responding to the request in moving traffic according to an embodiment. In FIG. 1, traffic lanes are indicated by dashed lines. Vehicles 12-16 occupy the lanes. Vehicles 12, 13, and 14 may be part of fleet of vehicles equipped for cooperative malfunction detection and V2V communication with other vehicles so equipped. Vehicles 12, 13. and 14 include transceivers (TX/RX) 18, 19, and 20, respectively, to allow communication, such as communication 21, between vehicle 12 and vehicle 13. Vehicles 15 and 16 represent other traffic and are not equipped with a cooperative malfunction detection circuit or with V2V communication capability. Vehicles 12-14 may also communicate with infrastructure 22. Infrastructure 22 may be a cellular base station or dedicated hardware for relaying communications between the vehicles and with other services such as an automobile maintenance center or car dealership. Vehicles 12, 13, and 14 each includes a transceiver 18, 19, and 20, respectively, for communicating with infrastructure 22 and each other. Vehicles 12, 13, and 14 include various sensors. For example, vehicles 12, 13, and 14 each have multiple image sensors denoted by a circled "C" and radar sensors denoted by a circled "R". Other sensors may also be included that are not shown in FIG. 1, such as for example, light detection and ranging (lidar), microphones, and infra-red sensors. Vehicles 12, 13, and 14 may be any type or combination of motor driven vehicles such as cars, motorcycles, trucks, etc. Other common names for motor vehicles include, for example, "cars" and "automobiles".

Each car of a fleet of cars is equipped to monitor other cars and report observed malfunctions of an observed car while moving in traffic on a highway or road. If the monitoring car detects an issue with one of the neighbouring cars it sends a notification to the car that has the detected issue.

As mentioned above, the vehicles of the fleet all have cameras and other sensors (radar, lidar, infrared cameras, etc.) observing and measuring characteristics of surrounding cars while they are driving. These sensors may already be installed in the car by the car's manufacturer for other reasons, such as for providing situational awareness for the driver and to support safety features of the vehicle. In addition to the sensors, each of the vehicles includes a cooperative malfunction detection circuit that includes a number of algorithms and hardware, such as a coprocessor for incident detection. The vehicle performing the role of the observer vehicle uses the cooperative malfunction detection circuit with the sensors and algorithms to detect issues or malfunctions with an observed vehicle. Each algorithm can be based on machine learning (ML) as well as any other common techniques. Each algorithm is tailored to analyze one or several specific features of a moving vehicle based on sensor data and generate reports if issues are detected. For example, a ML algorithm may be trained to know what a faulty headlight or tail light looks like. In one embodiment, such reports can then be sent to the observed (monitored) vehicle and can be shown to the vehicle's driver. In another embodiment, the observer vehicle can send raw sensor data to the observed vehicle and the observed vehicle uses its cooperate malfunction detection circuit to analyze the data and generate the report. There are advantages and disadvantages to each of the embodiments that will be discussed below.

The observer car (the car doing the sensing) needs to have a way of identifying the observed car with respect to its digital identity (ID). Specifically, the observer car needs a way to link the observed physical car to a digital entity to which it can send an alert message in case of an issue. The digital identity can be done several ways. A special identification code may be affixed to the outside of the vehicle that encodes the digital identity of the car using, e.g., a visually readable code. One example of a visually readable code is a quick response (QR) code. A digital ID of the car can be encoded in the QR code, such as e.g., its IP address if an IP protocol is used. The QR code can also encode a cryptographic public key of the vehicle and/or the car's vehicle identification number (VIN).

Alternatively, each car of the fleet can broadcast its digital identity with, e.g., its VIN or vehicle registration number (license plate number) and other information about the car such as make, model, and year of manufacture. An observer car can extract the license plate number simply by using a camera on the observer car, and then communicate with infrastructure 22 using an internet connection to look up the corresponding digital identity of the car. In another embodiment, every car of the fleet can broadcast its identity on regular intervals. By using several antennas and a conventional localization algorithm, a car can pinpoint the direction from which the identity is being transmitted. The direction can be correlated with the observed vehicle from a camera view. The cars of the fleet may communicate using a conventional vehicle-to-vehicle (V2V) or Car to Car communication protocol. In another embodiment, the communications may be relayed between vehicles by infrastructure 22. Note that a car's digital identity may depend, as least in part, on what vehicle-to-vehicle or vehicle-to-infrastructure protocol the car uses for communication. For relatively short distances the V2V communications may be via, e.g., a ultra-wideband (UWB) protocol, WiFi, or Bluetooth. Communications with infrastructure 22 may be with a cellular protocol and the vehicles would be equipped with transceivers to allow both V2V and cellular communications.

When a contact is made between an observer car and an observed car, the observer car needs the ID of the observed car so that sensor data or a report summary of malfunctions may be sent. The observer car may use the QR code for the vehicle ID, license plate number or other means. A QR code may also be used to provide sensor markers so the observed car knows the location and type of sensors observing it. The vehicle's optical sensors can be used to observe the vehicle for non-functioning lights, leaking fluids, and other issues that can be seen visually. An infrared sensor may be used to detect heat sources and may be helpful in determining if the vehicle is overheating or on fire. The vehicle's radar or lidar sensors, if present, may be used for speed and relative location determination. The analysis of data from the vehicle's radar requires use of one or more algorithms and computational power.

The computations by the cooperative malfunction detection circuit can be performed in two different locations: the car that captures the data (the observer vehicle); or the car that is being observed (the observed vehicle). In the first case, the computational power comes from the observer vehicle and the observer vehicle's resources are used for the radar computations. To reduce the amount of data transmission between cars, only a summarized report may be generated by the observer vehicle, and then sent from the observer vehicle to the observed vehicle. In the second case, the computational power comes from the observed vehicle. If the observed car uses its computational resources to generate the report, then only the raw radar or other sensor data is transmitted V2V to the observed vehicle from the observer vehicle and the observed vehicle does the computations. These two scenarios allow a tradeoff between network traffic and computational resources.

Figure 2:
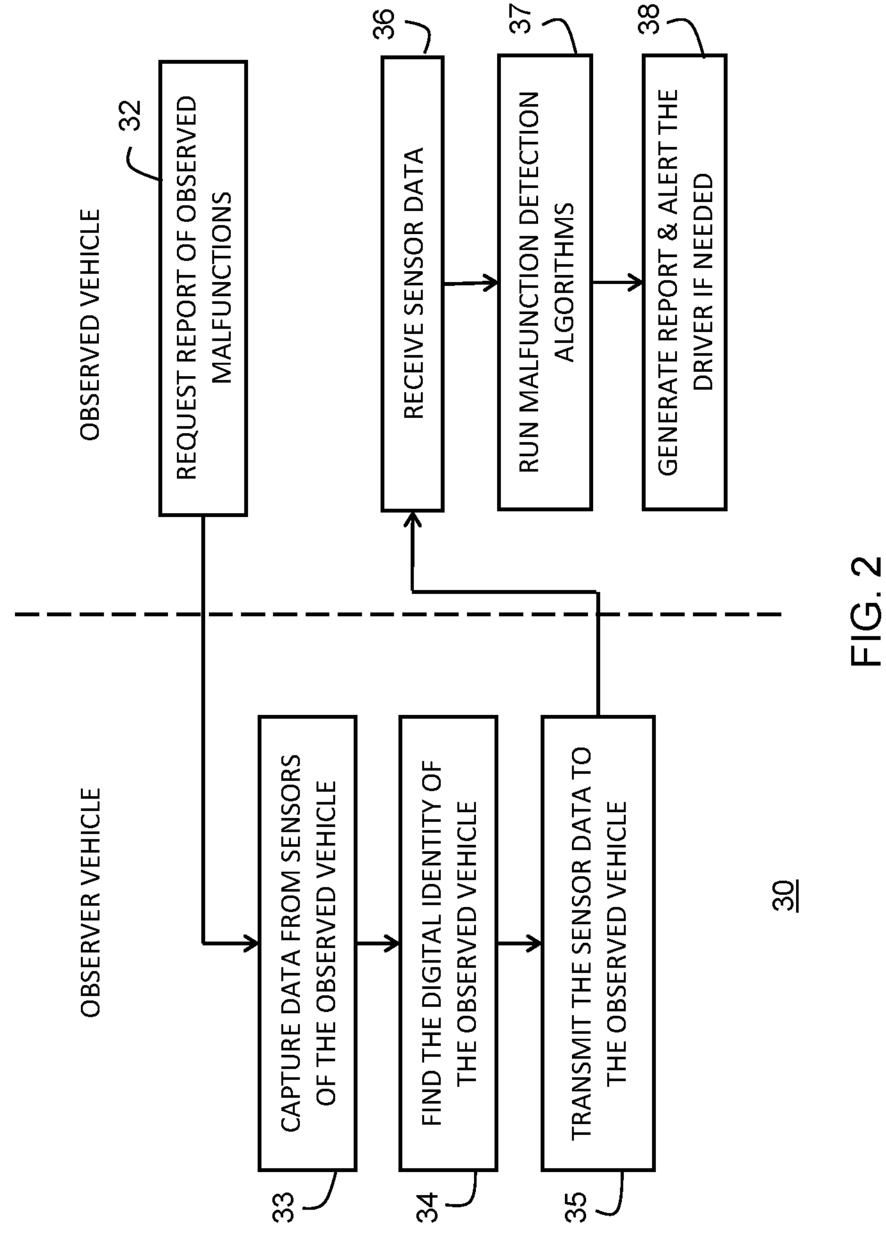
FIG. 2 illustrates a flow diagram of a method for cooperative vehicle malfunction detection according to an embodiment.

FIG. 2 illustrates a flow diagram of method 30 for cooperative vehicle malfunction detection according to an embodiment. Note that FIG. 2 does not show a time line of events and the processing and sensing may be performed in a different order from that shown. As an example, method 30 is performed between an observer vehicle on the left side of the dashed line and an observed vehicle on the right side of the dashed line. At block 32, a vehicle, such as vehicle 13 in FIG. 1, broadcasts a request for another vehicle to scan the observed vehicle with onboard sensors and report any observed malfunctions or anomalies. The broadcast is made using a relatively low power short range transmitter using, for example, UWB, WiFi, or Bluetooth communication protocols that can also be used to provide localization services with onboard receivers and transmitters. Using a short range communication system limits transmissions and reception of the broadcast to vehicles that are in the immediate vicinity and can provide the malfunction detection observations with minimal interference with other V2V communications. At block 33, another vehicle responses to the transmitted request, such as vehicle 12 in FIG. 1, and if vehicle 12 is in a position to observe vehicle 13 making the request, becomes the observer vehicle. The observer vehicle captures sensor data of the observed vehicle in block 33. The sensors of the observer vehicle can be used to read a visually readable code, e.g., a QR code, at block 34, that includes a digital identity of the observed vehicle as discussed above. Alternatively, the digital identity of the observed vehicle may have been transmitted in the initial broadcasted request for monitoring. At block 35, the captured sensor data is transmitted by the observer vehicle to the observed vehicle. The captured sensor data may be transmitted in one of a number of forms. For example, the captured sensor data may be raw sensor data from sensors on the observer vehicle that can be processed by the observed vehicle. At block 36, the observed vehicle receives the sensor data from the observer car. At block 37, the observed vehicle runs cooperative malfunction detection algorithms on the received sensor data. At block 38, the observed vehicle generates a report which may be a summary of the detected malfunction, if any. Also, an onboard vehicle diagnostics circuit of the observed vehicle may use the detected malfunction information to perform vehicle diagnostics to determine a cause for the observed malfunction. For example, in a case where the sensors on the observer vehicle observes visible smoke from an exhaust pipe of the observed car, the vehicle diagnostics may determine a cause for the smoke. The driver can be alerted of the detected malfunction by displaying a message on the information display screen on the dash.

Note, that the case when a car receives only the sensor data and performs a malfunction analysis itself may provide a more accurate result, because there may be many different vehicles equipped with the cooperative malfunction detection circuits and each model may require different knowledge to diagnose. Thus, a car getting only the raw sensor data and performing the analysis of the sensor itself would be able to store and use only one car model, allowing an analysis that is tailored to the specific model of the car. One simple example of the knowledge is the specific locations of all synchronized turn signals on the car.

On the other hand, performing the malfunction analysis on the raw sensor data by the observer vehicle may be faster because the malfunction analysis may be performed directly on, e.g., a video streaming from the cameras and other sensors without storing the stream of data. Then only a result of the malfunction analysis has to be sent to the observed car. This might be advantageous because the observer vehicle and observed vehicle may not be in communications range long enough to transmit all the sensor data. In one embodiment, to cope with this issue, cars that use navigation systems may exchange route information to determine whether they will follow the same path for enough time to perform the analysis and send the report.

Figure 3:
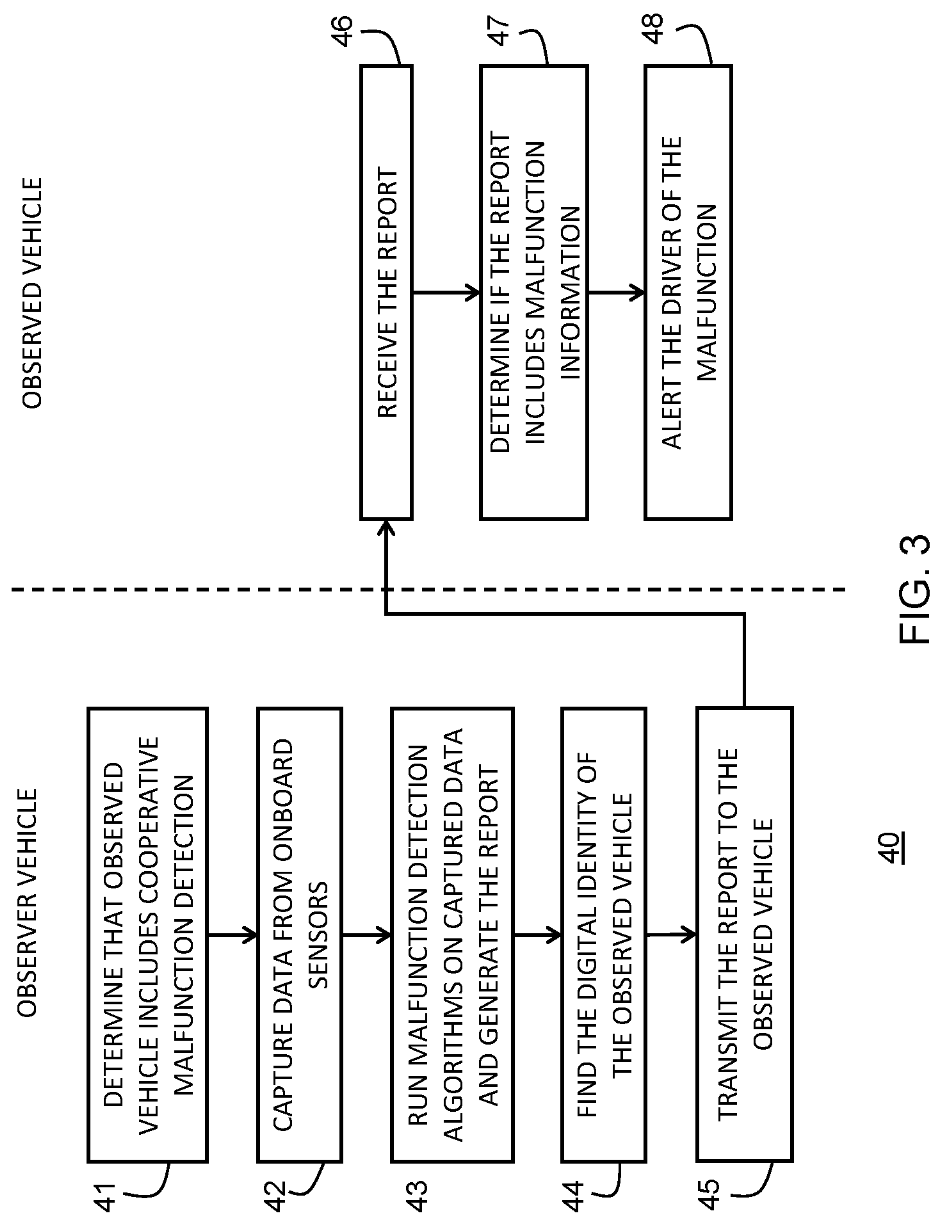
FIG. 3 illustrates a flow diagram of a method for cooperative vehicle malfunction detection according to another embodiment.

FIG. 3 illustrates a flow diagram of method 40 for cooperative vehicle malfunction detection according to another embodiment. Note that FIG. 3 does not show a time line of events and the processing and sensing may be performed in a different order from that shown. As another example of cooperative malfunction detection, method 40 is performed between an observer vehicle on the left side of the dashed line and an observed vehicle on the right side of the dashed line. In method 40, the observer vehicle, at block 41, determines if another vehicle is within sensor range and includes cooperative detection. For example, the observer vehicle may be vehicle 12 in FIG. 1. The determination may be made by using onboard sensors to detect and ID the other vehicle, which may be, e.g., vehicle 13 in FIG. 1. At block 42, data is captured of the observed vehicle using onboard sensors, such as cameras and radar. At block 43, after data is captured, a malfunction detection algorithm is run on the captured data and a report is made of the findings of the malfunction detection algorithm. At block 44, the observer vehicle locates the digital identity of the observed vehicle, which may be encoded in a visually readable code, e.g., a QR code affixed to the observed vehicle. At block 45, the report is transmitted to the observed vehicle. At block 46, the report is received by the observed vehicle. As mentioned above, a conventional V2V protocol may be used for communication. At block 47, the observed vehicle determines if the report includes malfunction information. At block 48, the driver of the observed vehicle is alerted, e.g., a message is displayed on a display screen. In addition, the observed vehicle may run onboard diagnostics on the sensor data and report and determine the cause of the malfunction, e.g., determine a reason visible smoke is exiting the exhaust.

The cooperative malfunction detection of the surrounding vehicles can be made in several different ways. For example, cars in a cooperative fleet of cars may monitor and communicate with each other continuously or occasionally at a predetermined frequency. The presence of cooperative malfunction detection functionality in a vehicle may be visible to other vehicles either by special markers on the car itself or in broadcasted messages from the cars. Also, the cooperative malfunction detection function may be provided by the potential observed cars "on demand". In such case a car can send broadcasted requests for analysis and if another car from the cooperative fleet is nearby then it can provide this service. An example is provided in FIG. 1 as discussed above. The system can be set up so that in addition to the driver, a dealership or car repair facility can also access the reports and/or videos that were provided by the cooperative fleet. Based on the reports, the dealership or repair facility can likely do better diagnostics as well as repair work on the cars.

In addition to a report from one observer vehicle, reports from multiple vehicles for specific detected malfunctions can be received and used for the malfunction detection analysis. Also, the reports and sensor data from multiple vehicles can be aggregated to generate one final report that provides a higher certainty on the detection. For example, if at some point the car gets an alert about a malfunctioning light, the observed vehicle may transmit more requests for observation about the specific light. If multiple analyses provide the same result then we have a higher certainty the malfunction exists. Aggregating reports from multiple observer vehicles can also help to mitigate false alerts.

It is possible that some observations of potential malfunctions are not able to lead to a clear-cut or distinct conclusion about whether there is a malfunction and what that malfunction is. For example, maybe sensor data from an infrared sensor indicates one portion of a car is slightly overheating. To acquire more understanding of the potential malfunction, sensor data related to the observation can be sent to an automobile maintenance facility or car dealership for further investigation. This can also help to detect issues faster on earlier stages.

In some cases, an externally organized cooperative analysis can be provided as a paid service. For example, there may be many different car manufacturers represented in a fleet of cooperative cars, and the vehicles of the fleet all follow the same V2V communication protocol. However, some car manufacturers include better sensors, better analysis or larger fleets of cars. Moreover, in the case when the driver can encode the analysis request frequency in the vehicle, some vehicles may transmit more requests than others. In addition, a paid service may be attractive to owners of observer vehicles that provide the analysis because it uses more computational resources of that vehicle without benefitting the vehicle owner directly. The owner of the vehicles receiving this service can subscribe and pay a yearly fee. The price for the service can be fixed per analysis request or can vary depending on the density of cars in the cooperative fleet in the areas where the driver lives or usually drives. The fees paid by the owner of the analyzed vehicle can go to the owners of the observer vehicles. This may provide an incentive for the drivers of observer vehicles to use the observer/analyzer vehicle mode. For areas that have a point system, each driver will receive points when its vehicle performs the analysis and spend these points to request analysis from the cooperative fleet.

Many different issues can be detected by simple external monitoring of a car while it drives. Here is a list of some simple examples: detection of an external light that is brighter or dimmer than the other light; one of the external lights does not turn on when expected; smoke coming from the vehicle, e.g., from the exhaust pipe; wheels that wobble due to incorrectly balanced tires, incorrect inflation pressure, or loose or missing lug nuts; a car is leaning to one side due to, e.g., a broken shock absorber; liquid leaking from the car; overheating portions of the car detected using infra-red sensors; strong vibrations of some parts of the vehicle detected using radar, lidar, or video analysis; the exhaust pipes from the engine coming loose; and the license plate is unreadable because it is missing or dirty.

In another embodiment of the case shown in FIG. 2 where full raw sensor data is sent from the observer vehicle to the observed vehicle, additional data may be collected, and a detailed log of events created by the observed vehicle, to provide additional data for a more complete malfunction analysis. For example, after the observed vehicle and the observer vehicle coordinate cooperative malfunction detection, the two vehicles may synchronize clocks and the observed vehicle may record a detailed log of events that happen in the observed vehicle while the observer vehicle is collecting and transmitting the raw sensor data. Using timestamps to synchronize the incoming raw sensor data with the detailed log of events, the observed vehicle will be able to paint a more precise picture of what is happening with the car. For example, the detailed log of timestamped events may be created by frequent or continuous sampling of many of the things that happen in the observed vehicle such as button presses, vehicle speed, steering wheel movements, engine parameters such as fuel injection duty cycle, transmission gear changes, etc. A body control module and an engine control unit of many modern automobiles already have the ability to record, or log, most or all of this information. This will help the observed vehicle analyze the received raw sensor data more accurately. For example, if the visual sensor data from the observer vehicle shows the observed vehicle turning but does not show an illuminated turn signal, this may indicate that the turn signal is malfunctioning. However, using the detailed log of events, the observed vehicle can determine that the turn signal may not have illuminated because the driver failed to turn on the turn signal during the turn. Regarding the embodiment, of FIG. 3, where the observer vehicle provides the computation resources, a driver of an observed vehicle may choose to not provide the detailed log of timestamped events because the volume of transmitted data may be too large, and to protect privacy.

Figure 4:
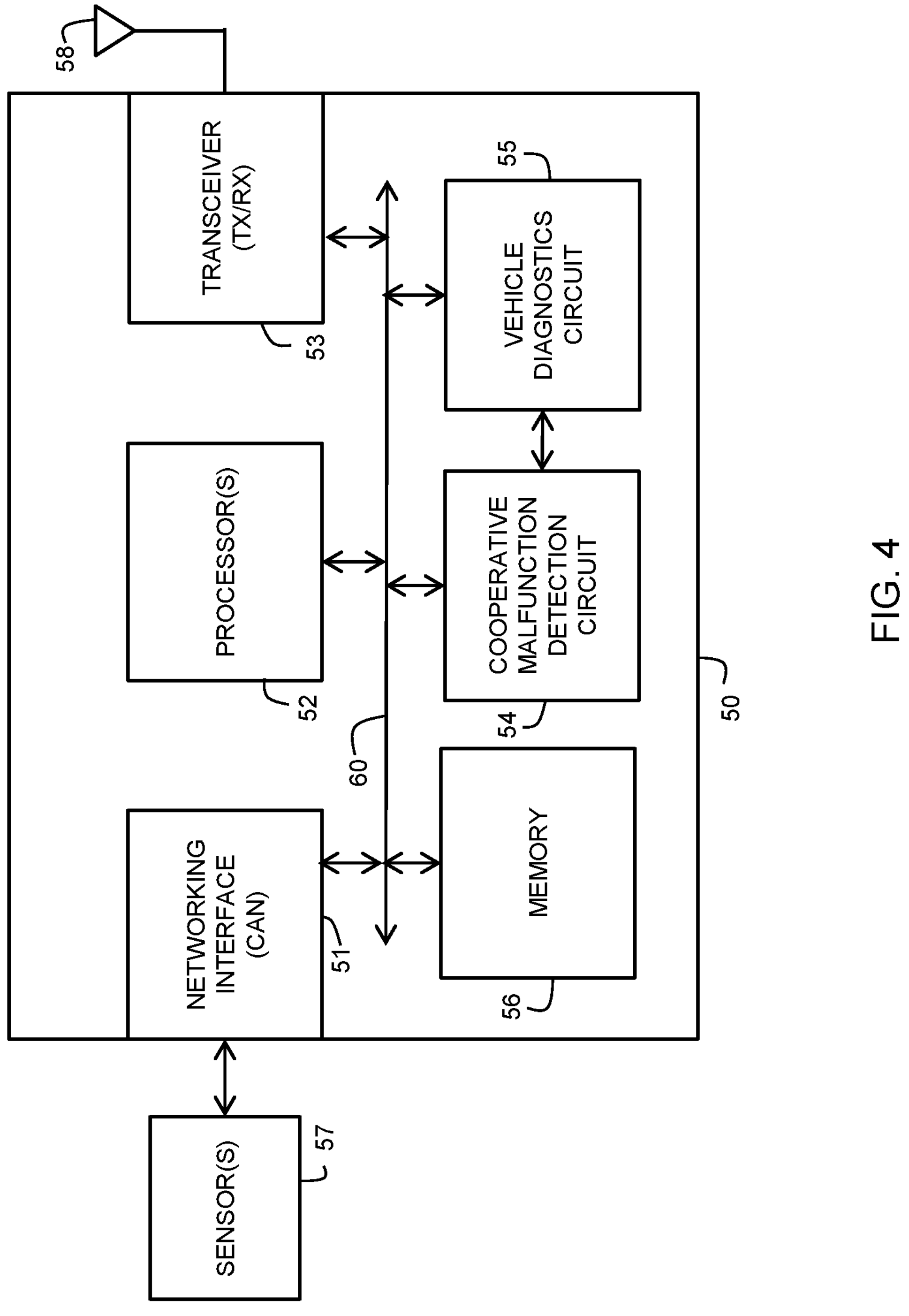
FIG. 4 illustrates an onboard data processing system according to an embodiment.

FIG. 4 illustrates onboard data processing system 50 according to an embodiment. Data processing system 50 may be implemented using one or more integrated circuits and may be used in an implementation of the described embodiments onboard an observer vehicle or observed vehicle. In one example, data processing system 50 may be a system on a chip (SoC). In another embodiment, data processing system 50 may include multiple integrated circuits (ICs), also known as chips. Data processing system 50 may include a bus 60. Coupled to bus 60 is one or more processors or processor cores 52, transceiver 53, networking interface 51, cooperative malfunction detection circuit 54, vehicle diagnostics circuit 55, and memory 56. One or more sensors(s) 57 and antennas 58 may be included in the vehicle and coupled to data processing system 50.

The one or more processors 52 may include any hardware device capable of executing instructions. The instructions may be stored in memory 56. For example, processor 52 may execute programs for cooperative malfunction detection circuit 54 and vehicle diagnostics circuit 55. Cooperative malfunction detection circuit 54 and vehicle diagnostics circuit 55 may be software or a combination of hardware and software. Programs in cooperative malfunction detection circuit 54 may include machine learning algorithms that are trained to receive sensor inputs and generate a malfunction detection report. The malfunction detection report may be generated by ML algorithms running on a data processing system 50 on an observer vehicle or an observed vehicle as discussed above. Also, the cooperative malfunction detection circuit may be configured to create a detailed and timestamped log of events that occur while sensor data is being received, and to analyze the sensor data with the timestamped log to generate the malfunction detection report. Malfunction detection circuit 54 may include a dedicated coprocessor for processing the sensor data. A vehicle diagnostics circuit 55 may provide vehicle diagnostics for the internal functions of the automobile and may be able to determine the causes for the observed malfunctions.

Processor 52 may be, for example, a microprocessor, field programmable gate array (FPGA), application-specific integrated circuit (ASIC), or similar device. Because vehicle safety may be involved and the algorithms may be proprietary to a vehicle manufacturer, the processor 52 and cooperative malfunction detection and circuit 54 may be implemented in a secure hardware element and may be tamper resistant.

Memory 56 may be any kind of memory, such as for example, L1, L2, or L3 cache or system memory. Memory 56 may include volatile memory such as static random-access memory (SRAM) or dynamic RAM (DRAM), or may include non-volatile memory such as flash memory, or other volatile or non-volatile memory. Memory 56 is provided to store the machine learning algorithms and other computer programs used by data processing system 50. Memory 56 may be implemented in a secure hardware element or other type of secure storage.

Networking interface 51 may include one or more circuits for enabling communication with other hardware devices such as sensors 57. For example, networking interface 51 may include, or be coupled to, a controller area network (CAN) commonly used in automobiles for communication between modules. Networking interface 51 may also include a network interface card (NIC) configured to communicate according to the Ethernet protocol. Also, networking interface 51 may implement a TCP/IP stack for communication according to the TCP/IP protocols.

Transceiver 53 may include one or more transmitters and receivers for communicating wirelessly with another vehicle over one or more antennas 58 using one or more V2V communications protocol or vehicle to infrastructure protocol. In one embodiment, one or more of UWB, WiFi, or Bluetooth may be used for communications. Transceiver 53 may transmit the reports using a transmitter (TX) and sensor information from the vehicle when it is performing an observer vehicle role. Transceiver 53 may receive the reports using a receiver (RX) and sensor information from another vehicle when the vehicle is in an observed vehicle role. Transceiver 53 may also include a cellular transceiver for communicating with infrastructure in order to relay communications with another vehicle or with, for example, a car maintenance facility via the internet.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. The terms "circuit" and "circuitry" may refer to hardware, software, or a combination of hardware and software.

Unless stated otherwise, terms such as "first" and "second" are used to arbitrarily distinguish between the elements such terms describe. Thus, these terms are not necessarily intended to indicate temporal or other prioritization of such elements. The term "coupled," as used herein, is not intended to be limited to a direct coupling or a mechanical coupling.

What is claimed is:

1. A method for cooperative malfunction detection between an observer vehicle and an observed vehicle, the method comprising:

requesting, by the observed vehicle, a report of observed malfunctions of the observed vehicle from the observer vehicle via a vehicle-to-vehicle communication system;

detecting and capturing sensor data of the observed vehicle by the observer vehicle;

transmitting the captured sensor data to the observed vehicle using the vehicle-to-vehicle communication system;

running, by the observed vehicle, a malfunction detection function on the captured sensor data and generating a report of a malfunction, wherein the malfunction indicated in the report is identified based on an event logged by the observed vehicle corresponding to an abnormal condition inside the observed vehicle latent to a driver of the observed vehicle, an event indicated by the captured sensor data, a time of the event logged by the observed vehicle, a time of the event indicated by the captured sensor data; and a determination that the time of the event indicated by the captured sensor data occurs at a same time as the event logged by the observed vehicle corresponding to the abnormal condition inside the observed vehicle latent to the driver of the observed vehicle, wherein each vehicle has a respective clock which are synchronized and the malfunction is identified based on the logged event and the event indicated by the captured sensor data being the same time as indicated by the respective clocks; and notifying a driver of the observed vehicle of the report to facilitate further diagnosis of a cause of the malfunction and repair of the observed vehicle.

2. The method of claim 1, further comprising:

synchronizing clocks of the observer vehicle and the observed vehicle;

creating, by the observed vehicle, a timestamped log of events in the observed vehicle while the observer vehicle is detecting and capturing the sensor data; and using the timestamped log of events with the captured sensor data to generate the report.

3. The method of claim 1, further comprising the observed vehicle transmitting an identity of the observed vehicle to the observer vehicle.

4. The method of claim 1, wherein the sensor data is captured using one or more of an image sensor, radar sensor, lidar (light detection and ranging) sensor, and infra-red sensor.

5. The method of claim 1, further comprising identifying the observed vehicle by the observer vehicle reading a visually readable code on the observed vehicle using an optical sensor attached to the observed vehicle.

6. The method of claim 1, wherein requesting a report of observed malfunctions of the observed vehicle further comprises continuously transmitting a request for, by the observed vehicle, a report of observed malfunctions from any vehicle within range.

7. The method of claim 6, wherein continuously transmitting the request further comprising selecting, by the observed vehicle a specific frequency for the continuously transmitted requests.

8. The method of claim 1, further comprising receiving multiple reports of observed malfunctions from multiple vehicles by the observed vehicle.

9. The method of claim 8, wherein the multiple reports are requested by the observed vehicle for a particular malfunction and the multiple reports are aggregated to generate one final report.

10. The method of claim 1, further comprising the observed vehicle communicating the report of observed malfunctions to an onboard vehicle diagnostics circuit for further analysis.

11. The method of claim 1, wherein the condition is an engine parameter, the captured sensor data is one or more of smoke coming from the vehicle and overheating portions of the vehicle, and the malfunction is an engine malfunction.

12. The method of claim 1, wherein the condition is an external light activated, the captured sensor data is an external light is not on, and the malfunction is an external light actuator.

13. The method of claim 1, wherein the condition is a tire pressure, the captured sensor data is a tire is wobbling, and the malfunction is related to the tire.

14. A data processing system implemented in a first vehicle, the data processing system comprising:

a transceiver coupled to an antenna for communicating with a second vehicle or an infrastructure, the transceiver coupled to an antenna to receive a request for cooperative vehicle malfunction detection from the second vehicle;

a networking interface coupled to communicate with a plurality of sensors mounted on the first vehicle;

a cooperative malfunction detection circuit coupled to receive sensor data from the second vehicle via the transceiver, the cooperative malfunction detection circuit configured to analyze the sensor data and generate a report of observed vehicle malfunctions, wherein a malfunction indicated in the report is identified based on an event logged by the first vehicle corresponding to an abnormal condition inside the first vehicle latent to a driver of the first vehicle, an event indicated by the received sensor data, a time of the event logged by the first vehicle, a time of the event indicated by the received sensor data; and a determination that the time of the event indicated by the received sensor data occurs at a same time as the time of the event logged by the first vehicle corresponding to the abnormal condition inside the first vehicle latent to the driver of the first vehicle, wherein each vehicle has a respective clock which are synchronized and the malfunction is identified based on the logged event and the event indicated by the received sensor data being the same time as indicated by the respective clocks; and a vehicle diagnostics circuit configured to perform vehicle diagnostics using the report of observed vehicle malfunctions to determine a cause for an observed vehicle malfunction to facilitate repair of the first vehicle.

15. The data processing system of claim 14, wherein the cooperative malfunction detection circuit is further configured to create a timestamped log of events that occur while the sensor data is being received, and wherein the cooperative malfunction detection circuit is configured to use the timestamped log of events with the received sensor data to generate the report.

16. The data processing system of claim 14, wherein the first vehicle determines a vehicle identity of the second vehicle.

17. The data processing system of claim 14, wherein the sensor data is captured using one or more of an image sensor, radar sensor, lidar (light detection and ranging) sensor, microphone, and infra-red sensor.

18. The data processing system of claim 14, further comprising using a sensor of the plurality of sensors to read a visually readable code on the second vehicle for providing an identify of the second vehicle.

19. The data processing system of claim 14, wherein the transceiver is configured to continuously transmit a request for observed malfunctions to other vehicles within range of the first vehicle.

20. The data processing system of claim 14, wherein the cooperative malfunction detection circuit is configured to receive multiple reports of observed malfunctions from multiple vehicles regarding a specific observed vehicle malfunction.

21. The data processing system of claim 20, wherein the cooperative malfunction detection circuit is further configured to aggregate the multiple reports of observed malfunctions from multiple vehicles to provide one final report.

22. The data processing system of claim 14, wherein the transceiver communicates to other vehicles using one of an ultra-wideband (UWB), Wi-Fi, or Bluetooth communications protocol.

23. The data processing system of claim 14, wherein the data processing system is implemented on one or more integrated circuits.

* * * * *